United States Patent [19]
Brown, II

[11] 3,841,179
[45] Oct. 15, 1974

[54] SHAVE TOOL HOLDER
[76] Inventor: Robert S. Brown, II, 224 S. Main St., Marine City, Mich. 48039
[22] Filed: Aug. 17, 1973
[21] Appl. No.: 389,180

[52] U.S. Cl. .............................................. 82/35
[51] Int. Cl. ........................................ B23b 29/00
[58] Field of Search ............ 82/35, 36 R, 36 A, 37; 29/98

[56] References Cited
UNITED STATES PATENTS

| | | | |
|---|---|---|---|
| 2,451,684 | 10/1948 | Megel et al. | 82/36 |
| 3,503,287 | 3/1970 | Zeller et al. | 82/36 X |
| 3,566,723 | 3/1971 | Oborne | 82/36 |
| 3,575,073 | 4/1971 | Zeller et al. | 82/36 |
| 3,576,145 | 4/1971 | Bernath | 82/35 |
| 3,662,632 | 5/1972 | Riley | 82/36 |

Primary Examiner—Harrison L. Hinson
Attorney, Agent, or Firm—Harness, Dickey & Pierce

[57] ABSTRACT

A shave tool holder is designed to be mounted on the slide of an automatic screw machine. The tool holder has a pivotally adjustable way member mounted on the forward end of a two part base and providing ways for guidably supporting a floating cutter head. The tool base is held in assembly and in place on the slide by three laterally aligned screws which permit selective adjustment of the base either longitudinally or laterally of the slide.

10 Claims, 5 Drawing Figures

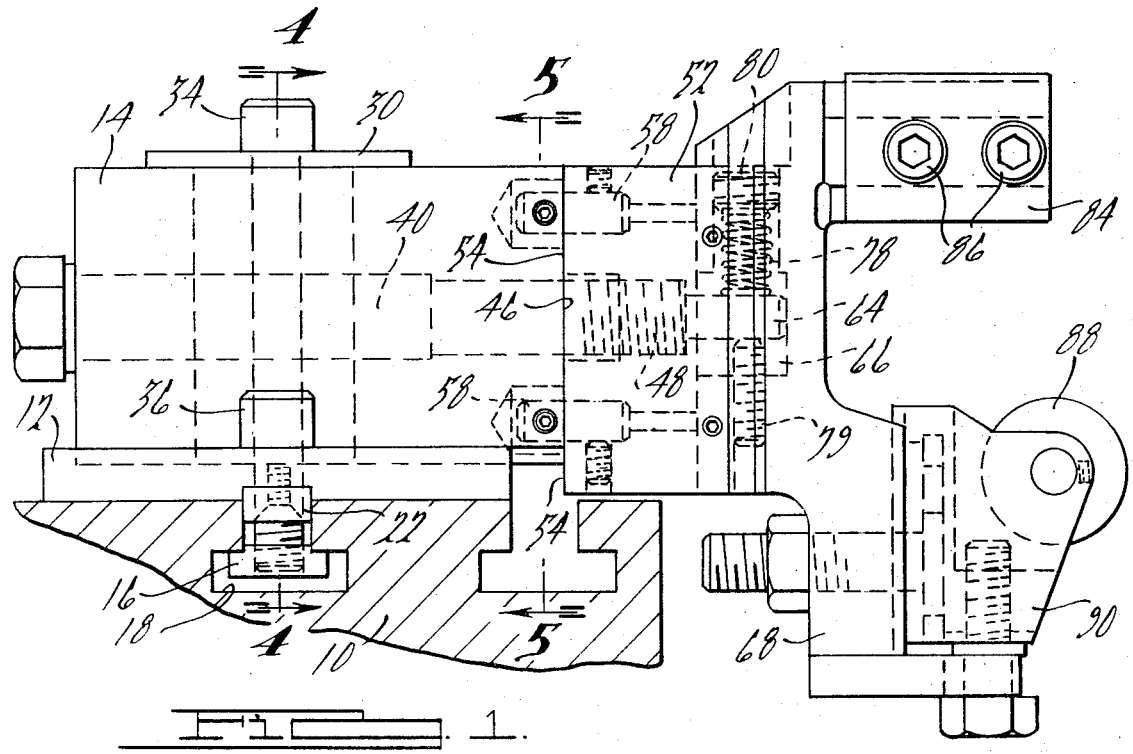
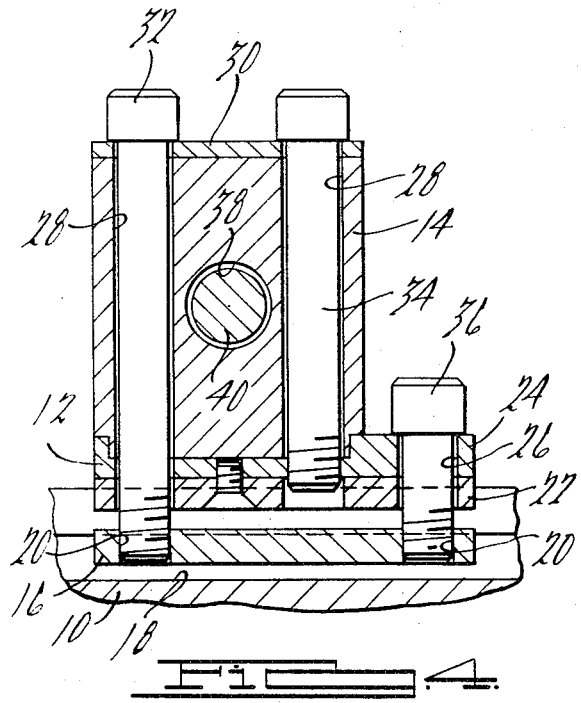

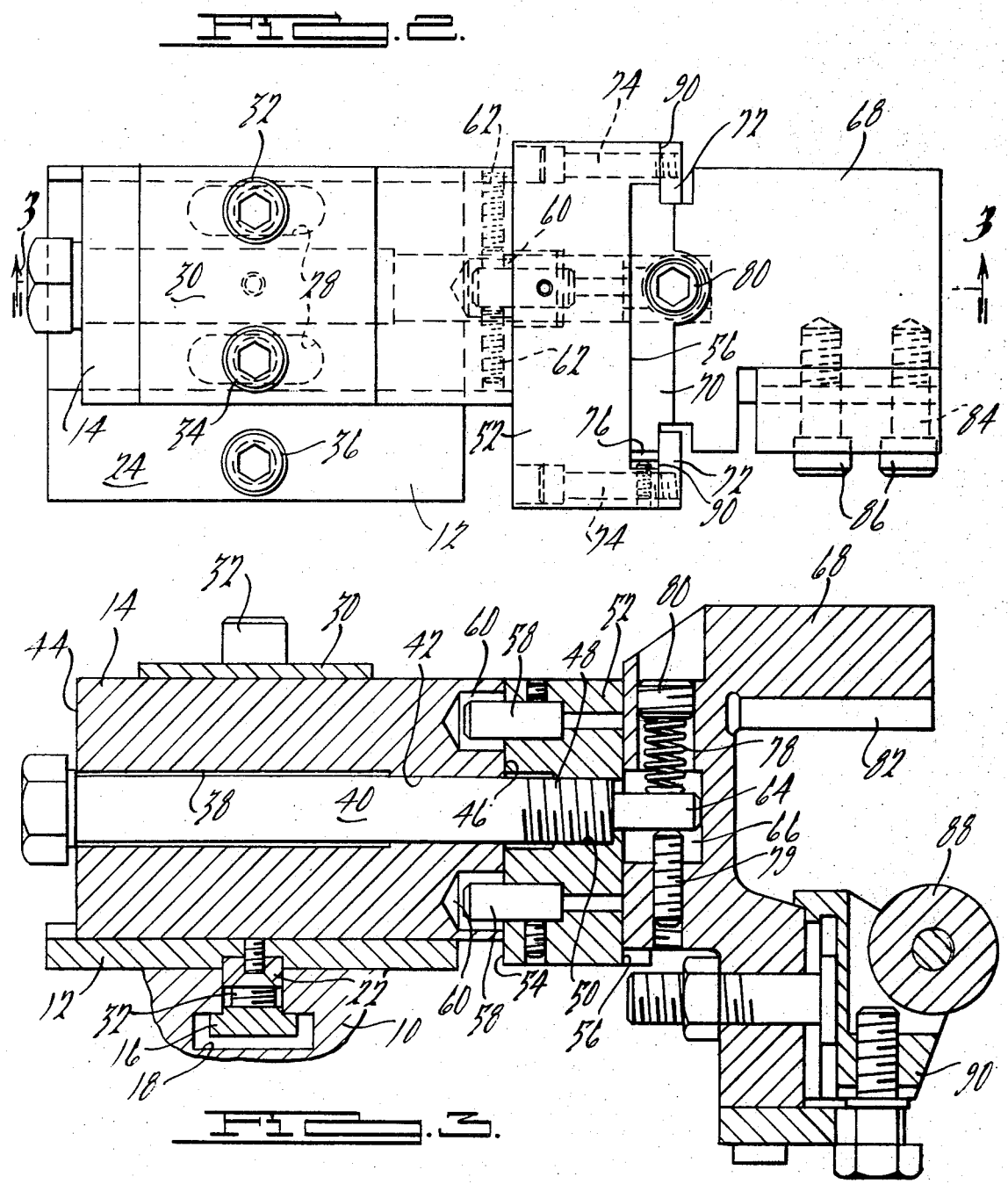

SHAVE TOOL HOLDER

SUMMARY OF THE INVENTION

The shave tool holder of the present invention is characterized by the use of a two part base by which the tool holder is mounted on the slide and a way member carried at the forward end of the base to provide ways for a floating cutter head. The relationship of the two parts of the base to one another and of the way member to the base, as well as other features of the design affords the tool holder a high degree of adjustability, with the adjustments being made in a highly convenient yet accurate manner. The tool holder incorporates means by which taper in the work surface may be rapidly and accurately eliminated through the pivotal or angular adjustment of the way member on the base. The tool holder is extremely easy to recondition, with the major wearable surfaces being easily ground on a conventional surface grinder. The tool is highly versatile, with the floating head being reversible on the way member for use at various stations on an automatic screw machine. The tool is compact in design and may be positioned extremely close to the spindle of an automatic screw machine for machining workpieces in locations very close to the spindle. Inasmuch as all of the screws that secure the tool base to the machine slide are laterally aligned, the tool may be made in extremely short lengths so as to be very compact compared to other shave holders. The tool is rugged in construction, yet is highly accurate and provides means for the positive control of head chatter.

DESCRIPTION OF THE DRAWINGS

FIG. 1 is a side elevational view of a tool holder embodying the principles of the present invention, the holder being shown positioned on a machine tool slide;

FIG. 2 is a plan view of the tool holder illustrated in FIG. 1;

FIG. 3 is a sectional view of the structure illustrated in FIG. 2 taken along the line 3—3 thereof; and FIGS. 4 and 5 are sectional views of the structure illustrated in FIG. 1 taken along the lines 4—4 and 5—5 thereof, respectively.

DESCRIPTION OF THE PREFERRED EMBODIMENT

Referring now to the drawings, FIG. 1 shows a cross slide 10 of an automatic screw machine which is designed to be advanced from left to right (as viewed in FIG. 1) to bring a tool holder into engagement with a rotationally driven workpiece (not shown). A tool holder constructed in accordance with the present invention is shown mounted on the slide 10 and includes a lower base member 12 and an upper base member 14. The two part base 12-14 is mounted on the slide 10 by means of a conventional T-nut 16 which is positioned within a T-slot 18 of the slide 10. The T-nut 16 has a pair of tapped holes 20 for the reception of screws which will be hereinafter described. The lower base member 12 carries a key 22 slidable in the upper portion of the T-slot 18.

As illustrated in FIG. 2, the lower base 12 is of greater width than the upper base 14, the lower base having a short offset portion 24 provided with an aperture 26 extending vertically therethrough. The upper base member 14 has a pair of laterally spaced slots 28 which are longitudinally elongated and extend vertically through the entire upper base member. An apertured cover plate 30 is positioned over the slots 28, while a pair of screws 32 and 34 extend through the cover plate 30 and through the slots 28. The screw 32 projects freely through the lower base 12 and is threaded into the T-nut 16. The screw 34, on the other hand, is threaded into the lower base 12. A screw 36 seats against the lower base portion 24 and extends through the opening 26 into threaded engagement with the T-nut 16. The three screws 32, 34 and 36 are in lateral or transverse alignment with one another and are in vertical alignment with the key 22 and T-nut 16.

The upper base 14 has a main bore 38 extending longitudinally through the center thereof. A clamping bolt 40 extends through the bore 38 and has a loose fit in the major portion of the bore 38 but is snugly fitted in a guide portion 42 of the bore 38 adjacent the forward end thereof. The head of the bolt 40 seats against a rear face 44 of the upper base 14 while a forward threaded portion 48 of the bolt 40 projects beyond a flat front face 46 of the upper base. The bolt portion 48 is threaded into a tapped bore 50 of a way member 52 mounted on the front end of the upper base 14. The way member 52 has a flat rear face 54 which conformably engages the front face 46 of the upper base member 14. The way member 52 has way surfaces 56 on its front face and carries a pair of pins 58 projecting rearwardly from its rear surface 54. The pins 58 are received in a pair of recesses 60 formed in the base front face 46. Two pair of adjusting setscrews 62 are carried by the upper base 14 so as to engage the opposite sides of each pin 58. Only one screw 60 of each pair need be used at a time, depending on the side of the tool holder which is most accessible. Assuming that the screws 62 on the left side of the tool holder (as viewed in FIG. 5) are to be used, the upper screw would be advanced and the bottom screw retracted to adjust the way member 52 in a clockwise direction (again as viewed in FIG. 5). By advancing one of the setscrews 62 and advancing the other setscrew of each pair of setscrews 62, the way member 52 is caused to pivot about the axis of the bolt 40.

The bolt 40 is formed with a small diameter extension 64 on its forward end which is received within a recess 66 of a floating head 68. The floating head 68 has a flanged guide portion 70 which rides on the way surfaces 56 of the way member 52 and is held in place by rails 72. The rails 72 are held on the way member 52 by means of screws 74. The way member 52 carries an adjustable gib 76 to provide transverse alignment to the floating head. The floating head 68 carries a spring 78 which seats against an adjustable threaded plug 80 on the floating head and bears against the extension 64. The spring 78 biases the head 68 in one direction to bring an adjustable screw threaded stop 79 into engagement with one side of the extension 64. The floating head 68 has a dove-tailed groove 82 against which a cutter (not shown) is secured by a clamp 84 held in place by screws 86. When the tool holder is advanced toward the workpiece, an adjustable backup roller 88 carried on the floating head 68 in opposition to the cutter thereof will be brought into engagement with one side of the workpiece. The position of the backup roller can be adjusted due to the fact that it is carried by an adjustable bracket 90, as is well known in this art.

It will be apparent that the floating head 68 and way member 52 may be easily inverted on the upper base 12. When this is done, the adjustable stop 79 will be positioned above the extension 64 (as viewed in FIG. 1) and the roller 88 will be above rather than below the workpiece (not shown). The reversal of the head 68 and way member 52 is accomplished simply by unthreading the bolt 40, pulling the way member 52 so that the pins 58 are withdrawn from the recess 60 and rotating the way member and head 180°.The bolt 40 can then be retightened to clamp the way member 52 in place.

Either longitudinal or lateral adjustment of the tool holder on the slide 10 is easily accomplished by selective loosening of the screws 32, 34 and 36. In order to advance or retract the upper base 14 relative to the lower base 12, the screws 32 and 34 are loosened. This may be accomplished without impairing the lateral position of the tool, due to the fact that the screw 36 is kept tight. For the purpose of laterally adjusting the tool holder without altering its longitudinal position on the slide 10, the screws 32 and 36 are loosened while keeping the screw 34 tight. The manner of adjusting the angular orientation of the way member 52 on the upper base 14 has already been described. Adjusting the position of the floating head 68 is accomplished simply by adjusting the screw stop 79. Chattering of the head 68 can be controlled by tightening the spring 78 as well as by tightening of the gib 76. Excessive clearance between the flange guide portion 70 of the floating head and the way surfaces 56 and rails 72 can be corrected by grinding a pair of surfaces 90 against which the rails 72 are seated. Should either the way surfaces 56 or the surfaces of the guide portion 70 become worn or damaged in use they are readily renewed by grinding on a conventional surface grinder.

What is claimed is:

1. A tool holder for machining a rotationally driven workpiece including a base, a way member mounted on the forward end of said base, a floating head slidably carried by said way member, means on said head for supporting a cutter, pivot means connecting said base and said way member, a pair of projections on the rear of said way member, a pair of recesses at the front end of said base receiving said projections in a manner permitting limited pivotal adjustment of said way member on said base, and screw means carried by said base adjustably engaging said projections to control pivotal movement of said way member about said pivot means.

2. The structure set forth in claim 1 in which said pivot means comprises a clamping bolt operable to clamp said way member against the front end of said base.

3. The structure set forth in claim 2 including an extension formed on said clamping bolt and an adjustable stop carried by said head engageable with said extension.

4. The structure set forth in claim 3 including a spring means carried by said head seated against said extension for biasing said head in a given direction relative to said way member.

5. The structure set forth in claim 4 including a work engaging backup roller carried by said head.

6. A tool holder adapted to be mounted on the slide of a machine tool for machining rotationally driven workpieces, said tool including an upper base member having longitudinally extending slots extending vertically therethrough, a lower base member on which said upper base member is positioned and having an apertured portion spaced laterally of said upper base member slots, a nut engageable in the machine slide and having a pair of tapped screw receiving holes formed therein, a floating cutter head carried by said upper base member, and at least three screws for securing said upper base member to said lower base member and said base members to said slide, a first one of said screws clampingly connecting said upper base member to said nut and passing freely through said lower base member, a second one of said screws clampingly connecting said upper base member to said lower base member and a third one of said screws clampingly connecting said lower base member to said nut.

7. The structure set forth in claim 6 including a cover plate positioned over the slots of said upper base member and defining a seat for heads of at least two of said screws.

8. The structure set forth in claim 6 including a way member pivotally adjustably mounted on the front of said upper base member and providing a guided sliding support for said head.

9. The structure set forth in claim 8 including a clamping bolt extending through said upper base member and connecting said way member thereto.

10. The structure set forth in claim 6 including a clamping bolt extending longitudinally through said upper base member between said slots and threadably engageable with a way member mounted on the front of said upper base member, said way member being pivotally adjustable about said bolt and adjustable means interengaging between said way member and said upper base member in a position laterally offset from said bolt for adjusting the pivotal position of said way member on said upper base member.

* * * * *